(12) United States Patent
Matsumoto et al.

(10) Patent No.: US 11,550,155 B2
(45) Date of Patent: Jan. 10, 2023

(54) VIRTUAL IMAGE DISPLAY APPARATUS AND OPTICAL UNIT

(71) Applicant: SEIKO EPSON CORPORATION, Tokyo (JP)

(72) Inventors: Daiki Matsumoto, Suwa (JP); Masatoshi Yonekubo, Suwagun Haramura (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 17/217,116

(22) Filed: Mar. 30, 2021

(65) Prior Publication Data

US 2021/0302741 A1    Sep. 30, 2021

(30) Foreign Application Priority Data

Mar. 31, 2020 (JP) .............................. JP2020-062279

(51) Int. Cl.
*G02B 27/01* (2006.01)
*H04N 9/31* (2006.01)
*G02B 26/08* (2006.01)

(52) U.S. Cl.
CPC ..... *G02B 27/0172* (2013.01); *G02B 26/0816* (2013.01); *H04N 9/3152* (2013.01)

(58) Field of Classification Search
CPC ................ G03B 21/005; G03B 21/006; G03B 21/0068; G03B 21/28; G03B 21/208; G03B 21/2066; G02B 26/10; G02B 26/0816; G02B 26/0833; G02B 26/0858; G02B 27/01; G02B 27/09; G02B 27/10; G02B 27/0101; G02B 27/0172; G02B 27/0178; G02B 27/0977; G02B 27/144; G02B 2027/017; G02B 2027/0172; G02B 2027/0178; G02B 2027/0179
See application file for complete search history.

(56) References Cited

U.S. PATENT DOCUMENTS

2017/0115485 A1* 4/2017 Saito ................... G03B 21/142
2018/0003964 A1* 1/2018 Tatsuno ............ G02B 27/0172
(Continued)

FOREIGN PATENT DOCUMENTS

JP    H11-237584 A    8/1999
JP    2020-008749 A   1/2020

*Primary Examiner* — Sultan Chowdhury
(74) *Attorney, Agent, or Firm* — Oliff PLC

(57) ABSTRACT

A virtual image display apparatus includes an image light generation device, a projection optical system configured to project image light emitted from the image light generation device, a folding mirror configured to reflect the image light from the projection optical system in an intersection direction, a semi-transmissive mirror configured to reflect a part of the image light from the folding mirror, and a concave mirror configured to reflect the image light from the semi-transmissive mirror forming an exit pupil, in which the folding mirror is disposed between the semi-transmissive mirror and the concave mirror when viewed in a first direction, provided that the first direction is a direction from an intersection point between a projection optical axis that is an optical axis of the projection optical system and the folding mirror toward an emission optical axis that is an optical axis from the concave mirror toward the exit pupil.

8 Claims, 7 Drawing Sheets

(56) References Cited

U.S. PATENT DOCUMENTS

| | | | |
|---|---|---|---|
| 2019/0084419 A1* | 3/2019 | Suzuki | G02B 27/0101 |
| 2020/0018966 A1 | 1/2020 | Komatsu et al. | |
| 2020/0117000 A1* | 4/2020 | Plagens | G02B 5/08 |
| 2020/0285048 A1* | 9/2020 | Matsushima | G02B 26/127 |

* cited by examiner

VIRTUAL IMAGE DISPLAY APPARATUS AND OPTICAL UNIT

The present application is The present application is based on, and claims priority from JP Application Serial Number 2020-062279, filed Mar. 31, 2020, the disclosure of which is hereby incorporated by reference herein in its entirety.

BACKGROUND

1. Technical Field

The present disclosure relates to a virtual image display apparatus that is a head-mounted display or the like, and an optical unit incorporated into the virtual image display apparatus. The present disclosure specifically relates to a virtual image display apparatus and the like of a type that causes image light to be reflected by a semi-transmissive reflective surface to enter a concave mirror, and allow the reflected light from the concave mirror to be viewed through the semi-transmissive reflective surface.

2. Related Art

As the virtual image display apparatus including the semi-transmissive reflective surface and the concave mirror, there exists a virtual image display apparatus including a prism member incorporated with the semi-transmissive reflective surface, for example, (see JP 2020-008749 A). In this apparatus, it is described that the image light incident on the prism member is totally reflected by a total reflective surface of the prism member toward the semi-transmissive reflective surface to be guided, and the semi-transmissive reflective surface is caused to reflect the image light toward a light collecting reflective surface disposed frontward of the prism member, and it is described that an angle, as a disposition angle of the semi-transmissive reflective surface, formed by a Y-axis serving as an up and down direction and the normal line of the semi-transmissive reflective surface is made 45 degrees or greater.

In the virtual image display apparatus of JP 2020-008749 A, a width in thickness direction of the prism member can be made small by standing the semi-transmissive reflective surface so that an inclination of the semi-transmissive reflective surface is 45 degrees or greater, however, in order to ensure see-through properties, two prism members need to be affixed to each other to make faces of the prism member on an external side and a user side parallel planes, resulting in an increase in weight of an optical system, and the concave mirror portion may be thickened and bulged because the concave mirror is obliged to be disposed on the external side of the prism member. In addition, because a prism mirror of an optical path bending mirror is provided separately from the prism member, a projection optical system and the prism mirror are to be arranged in a manner protruding to the forehead side on the upside of the prism member, which eventually enlarged the entirety of the optical system.

SUMMARY

A virtual image display apparatus according to one aspect of the present disclosure includes an image light generation device, a projection optical system configured to project image light emitted from the image light generation device, a folding mirror configured to reflect the image light from the projection optical system in an intersection direction, a semi-transmissive reflective surface configured to reflect a part of the image light from the folding mirror, and a concave mirror configured to reflect the image light reflected by the semi-transmissive reflective surface toward the semi-transmissive reflective surface forming an exit pupil, in which the folding mirror is disposed between the semi-transmissive reflective surface and the concave mirror.

DESCRIPTION OF EXEMPLARY EMBODIMENTS

First Embodiment

Hereinafter, a virtual image display apparatus in a first embodiment according to the present disclosure and an optical unit incorporated into the virtual image display apparatus will be described with reference to the drawings.

Figure 1:
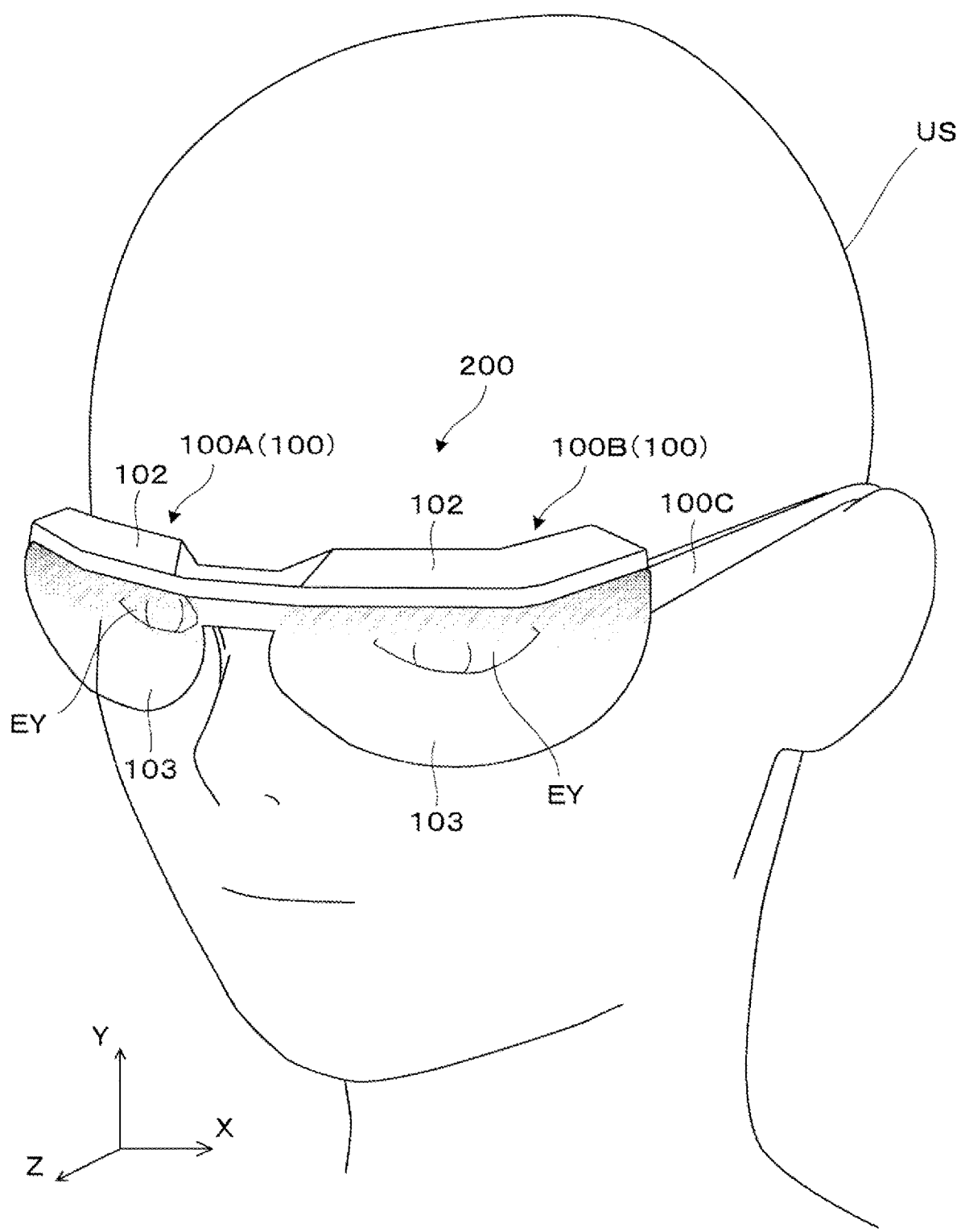
FIG. 1 is an external perspective view illustrating a mounting state of a virtual image display apparatus of a first embodiment.

FIG. 1 is an explanatory perspective view illustrating an external appearance of a head-mounted display (also referred to as HMD below) 200, the head-mounted display allowing an observer or wearer US wearing this apparatus to recognize video picture as a virtual image. In FIG. 1 and the like, an X, Y, and Z are an orthogonal coordinate system, a +X direction corresponds to a lateral direction in which both eyes EY of the observer or wearer US wearing the HMD 200 or a virtual image display apparatus 100 are aligned, a +Y direction corresponds to an upward direction orthogonal to the lateral direction for the wearer US in which the both eyes EY are aligned, and a +Z direction corresponds to a frontward direction or front face direction of the wearer US. The ±Y direction is parallel to a vertical axis or a vertical direction.

The HMD 200 includes a first display device 100A for right eye, a second display device 100B for left eye, and a support device 100C having a temple shape that supports the display devices 100A and 100B. The first display device 100A includes a display drive unit 102 disposed at the upper portion, and an appearance member 103 having an eyeglass lens-like shape and covers a front of the eye. Similarly, the second display device 100B includes the display drive unit 102 disposed at the upper portion, and the appearance member 103 having an eyeglass lens-like shape and covers the front of the eye. The support device 100C supports a top end side of the appearance member 103 via the display drive unit 102. The first display device 100A and the second display device 100B are optically right-left reversed, and hereinafter, the first display device 100A for right eye will be described as the virtual image display apparatus 100 of the representative.

Figure 2:
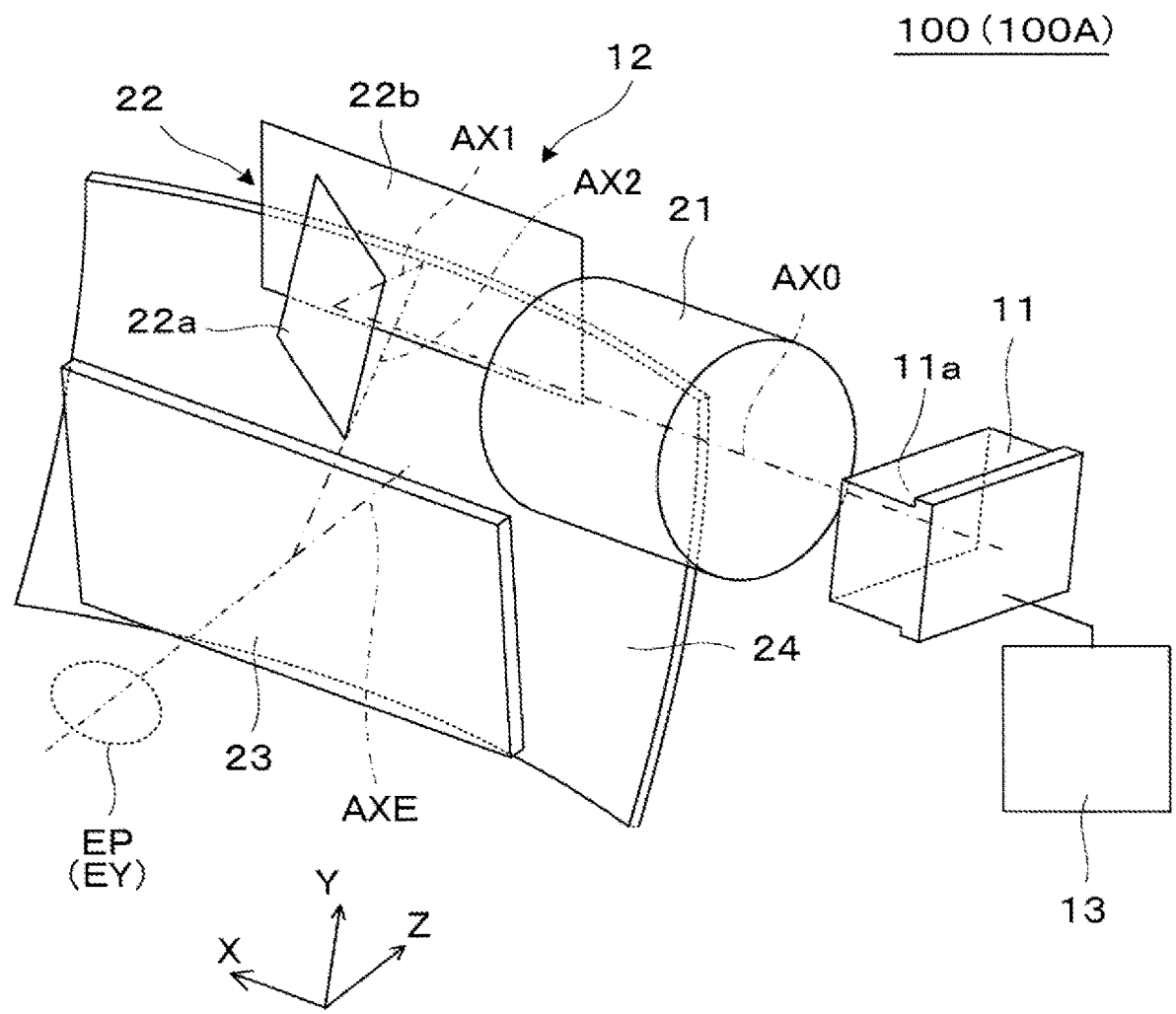
FIG. 2 is a perspective view illustrating structures of an virtual image display apparatus and the like in FIG. 1.
Figure 3:
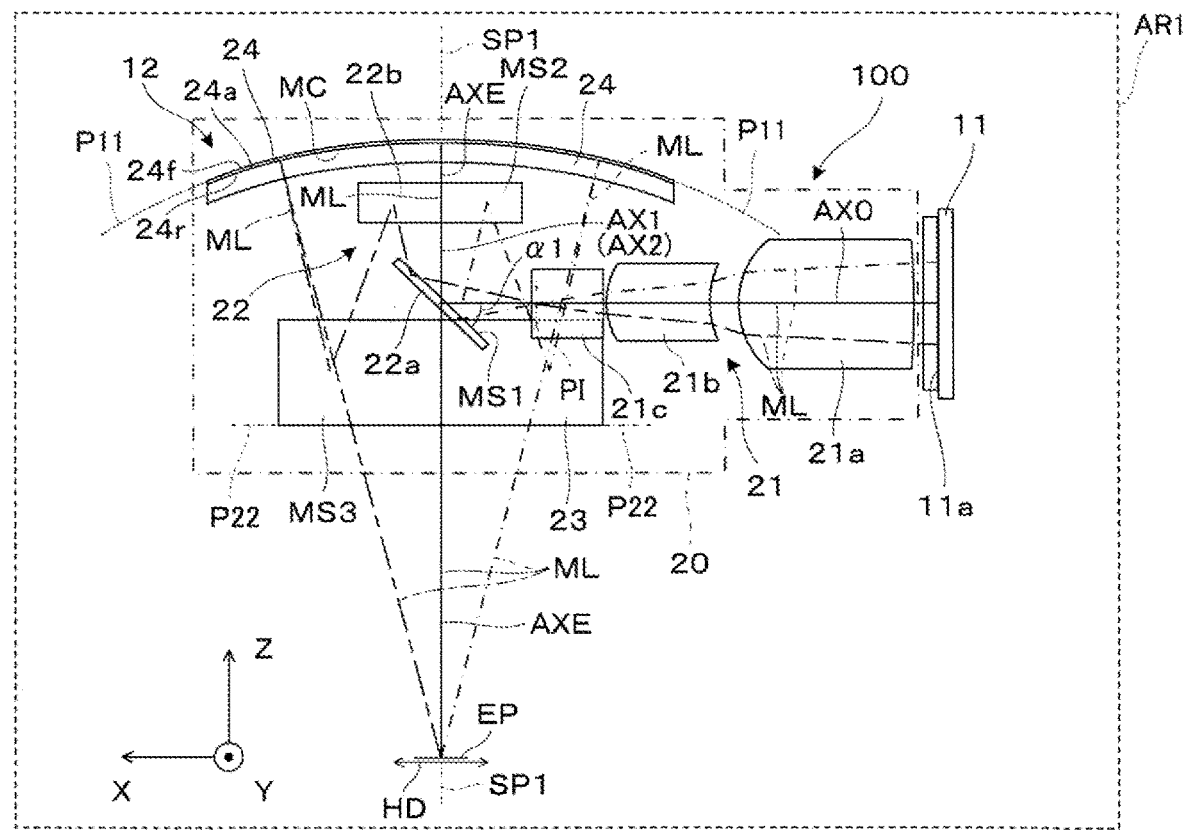
FIG. 3 is a plan view and a side view of a virtual image display apparatus in FIG. 1.
Figure 3:
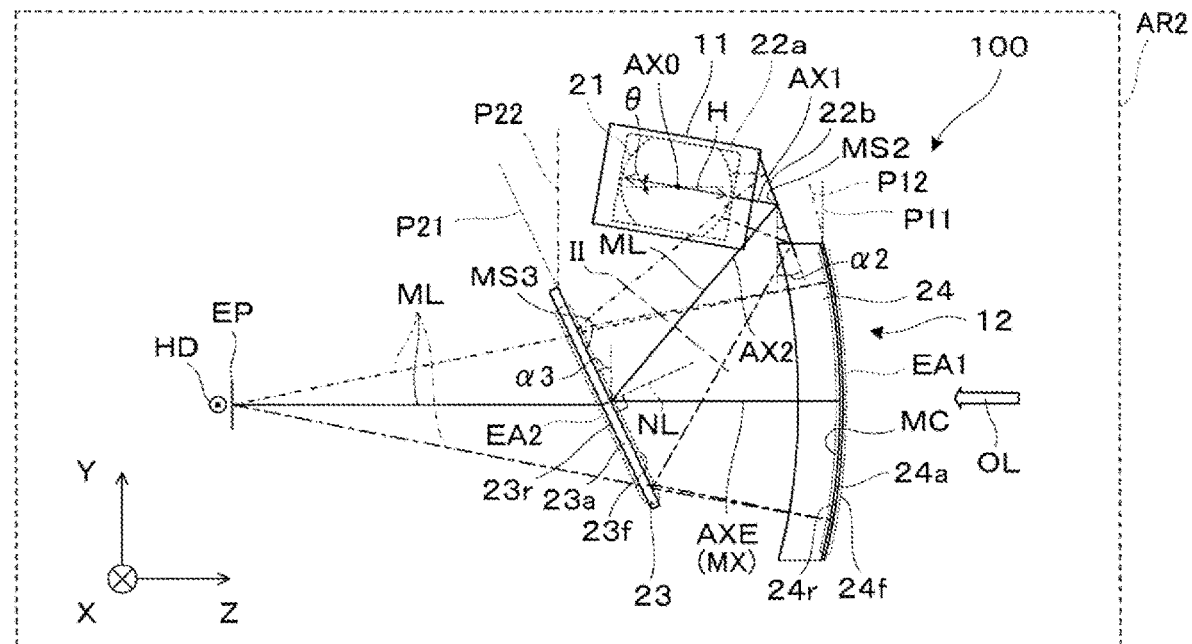

FIG. 2 is an explanatory perspective view illustrating the virtual image display apparatus 100 that is the display device 100A for right eye, and FIG. 3 is explanatory views illustrating an optical structure of the virtual image display apparatus 100. In FIG. 3, a first area AR1 is a plan view of an image light generation device 11 and an optical unit 12, and a second area AR2 is a side view of the image light generation device 11 and the optical unit 12.

As illustrated in FIG. 2, the virtual image display apparatus 100 includes the image light generation device 11, the optical unit 12, and a display control circuit 13. However, in this specification, the apparatus excluding the display control circuit 13 is also referred to as the virtual image display apparatus 100 in terms of achieving optical function.

The image light generation device 11 is a self-luminous type display device, that is, for example, an organic electro-luminescence (organic EL), and forms a still image or a video image in color on a two-dimensional display surface 11a. The image light generation device 11 is driven by the display control circuit 13 to perform display operation. The image light generation device 11 is not limited to the organic EL, and may be replaced by an inorganic EL, LED array, organic LED, laser array, quantum dot light-emitting type element, or the like.

The image light generation device 11 is not limited to the self-luminous type image light generation device, and may be constituted by an LCD or another light modulating element, and may be configured to form an image by illuminating the light modulating element with a light source such as a backlight. As the image light generation device 11, a liquid crystal on silicon (LCOS) (LCoS is a registered trademark), a digital micromirror device, and the like may be used in place of the LCD.

As illustrated in FIGS. 2 and 3, the optical unit 12 includes a projection optical system 21, a folding mirror 22, a semi-transmissive mirror 23, and a concave mirror 24. Here, an optical path from the image light generation device 11 to the folding mirror 22 is disposed on an upper side of the semi-transmissive mirror 23. In the optical unit 12, a projection optical axis AX0, which is an optical axis of the projection optical system 21, is disposed in a direction intersecting a virtual reference plane SP1 parallel to a YZ plane including a reflection optical axis AX2 that is an optical axis from the folding mirror 22 toward the semi-transmissive mirror 23, and an emission optical axis AXE that is an optical axis from the concave mirror 24 toward an exit pupil EP. In the optical unit 12, the reflection optical axis AX2 is angled with respect to a Y direction of the vertical direction, for example, and the folding mirror 22 and the semi-transmissive mirror 23 form an optical path that is inclined and twisted to be bent.

The projection optical system 21 projects image light ML emitted from the image light generation device 11. The projection optical system 21 causes the image light ML emitted from the image light generation device 11 to be incident toward the folding mirror 22 while converging the image light ML to form an image. The projection optical system 21 is not limited to a single lens, and includes, in the example illustrated in FIG. 3, three lenses 21a, 21b, and 21c, and may be constituted by two or more than four lenses. The lenses 21a, 21b, and 21c are not limited to spherical lenses, and may be aspheric lenses. The projection optical axis AX0, which is the optical axis of the projection optical system 21, extends parallel to a lateral X-axis direction.

The folding mirror 22 includes a first mirror 22a and a second mirror 22b in the order of the optical paths from the image light generation device 11. The folding mirror 22 reflects the image light ML from the projection optical system 21 in an intersection direction. Here, the intersection direction includes a direction that forms an angle greater than 0 degree with respect to the projection optical axis AX0, the direction being in a twisted relationship with the projection optical axis AX0. In case of the first embodiment, the folding mirror 22 bends the optical path in the vertical direction that is in the twisted relationship with the projection optical axis AX0. The semi-transmissive mirror 23 described later is disposed on a light emission side of the second mirror 22b, and the semi-transmissive mirror 23 may be referred to as a third mirror. An entrance pupil PI of the virtual image display apparatus 100 is disposed before the folding mirror 22, that is, on the image light generation device 11 side in a direction opposite to a traveling direction of the image light ML.

The first mirror 22a is a flat-plate shaped optical member, and includes a planar reflective surface MS1. The planar reflective surface MS1 of the first mirror 22a is composed of a metal film or a dielectric multilayer film. In this case, a reflective film composed of a single-layer film or a multi-layer film formed of metal such as Al, Ag, or the like is deposited on the flat-plate plane by vapor deposition or the like. The first mirror 22a causes the planar reflective surface MS1 to bend frontward the image light ML traveling in a lateral X direction, to cause the image light ML to enter the second mirror 22b. At this time, the projection optical axis AX0 that is the optical axis of the projection optical system 21 intersects a reflection optical axis AX1 from the first mirror 22a toward the second mirror 22b. The reflection optical axis AX1 extends in the +Z direction and the −Y direction along the YZ plane, and is inclined in a frontward oblique downward direction. The first mirror 22a is fixed to a frame of the display drive unit 102 illustrated in FIG. 1 by a non-illustrated member.

The first mirror 22a or the planar reflective surface MS1 is in an inclined state at an angle $\alpha_1 = 45$ degrees in the clockwise direction about the Y-axis when viewed from above with respect to a XY plane, assuming that the XY plane extending in the vertical direction is a reference. The normal line of the planar reflective surface MS1, when projected on an XZ plane, extends in an intermediate direction between the +Z direction and a −X direction, the intermediate direction extending in a direction of 45 degrees with respect to each of the +Z direction and the −X direction. Note that the first mirror 22a is in an inclined state so as to slightly face down toward the second mirror 22b about the X-axis as well.

The second mirror 22b is a flat-plate shaped optical member, and includes a planar reflective surface MS2. The planar reflective surface MS2 of the second mirror 22b is composed of a metal film or a dielectric multilayer film. In this case, a reflective film composed of a single-layer film or a multilayer film formed of metal such as Al, Ag, or the like deposited on the flat-plate plane by vapor deposition or the like. The second mirror 22b causes the planar reflective surface MS2 to bend backward the image light ML traveling frontward, to allow the image light ML to enter the semi-transmissive mirror 23 that is the third mirror. At this time, the reflection optical axis AX1 from the first mirror 22a toward the second mirror 22b intersects the reflection optical axis AX2 from the second mirror 22b toward the semi-transmissive mirror 23. The reflection optical axis AX2 extends in a −Z direction and the −Y direction along the YZ plane, and is inclined in a backward oblique downward direction. The second mirror 22b is fixed to the frame of the display drive unit 102 illustrated in FIG. 1 by a non-illustrated member.

The second mirror 22b or the planar reflective surface MS2 is in an inclined state at an angle α2=approximately from 20 to 40 degrees in the counterclockwise direction about the X-axis when viewed from the image light generation device 11 with respect to the XY plane, assuming that the XY plane extending in the vertical direction is a reference. The normal line of the planar reflective surface MS2 is within a plane parallel to the YZ plane, and is in an inclined state at an angle of approximately from 20 degrees to 40 degrees counterclockwise with respect to the Z-axis.

The semi-transmissive mirror 23 is a flat-plate shaped optical member that functions as a surface mirror having semi-transmissivity, and includes a planar reflective surface MS3. The semi-transmissive mirror 23 forms a metal film or a dielectric multilayer film at one surface 23f of a parallel plate 23a having uniform thickness and having transmissivity to make the planar reflective surface MS3. The planar reflective surface MS3 has reflectance and transmittance that are set to approximately 50%, for example. Note that an antireflective film may be formed on the other face 23r of the parallel plate 23a. The semi-transmissive mirror 23 causes the planar reflective surface MS3 to bend frontward the image light ML traveling obliquely backward, to allow the image light ML to enter the concave mirror 24. At this time, the reflection optical axis AX2 from the second mirror 22b toward the semi-transmissive mirror 23 intersects the emission optical axis AXE from the semi-transmissive mirror 23 toward the concave mirror 24. The emission optical axis AXE coincides with an axis line MX of the concave mirror 24 and extends frontward that is in the +Z direction. Here, the axis line MX of the concave mirror 24 typically means a rotation symmetry axis of the concave mirror 24. For example, when the concave mirror 24 deviates from a rotation symmetrical shape, the axis line MX of the concave mirror 24 means the normal line of a contact plane on the concave mirror 24 at an intersection point between the emission optical axis AXE and the concave mirror 24, the normal line passing through the intersection point. The semi-transmissive mirror 23 is disposed between the concave mirror 24 and the exit pupil EP at which an eye EY or a pupil is disposed to cover the exit pupil EP. The semi-transmissive mirror 23 may be fixed directly or indirectly to the frame of the display drive unit 102 illustrated in FIG. 1, and may be brought into a state where an arrangement relationship between the semi-transmissive mirror 23 and the concave mirror 24 and the like is properly set.

The semi-transmissive mirror 23 or the planar reflective surface MS3 is in an inclined state at an angle α3=approximately from 20 to 40 degrees in the counterclockwise direction about the X-axis when viewed from the image light generation device 11 with respect to the XY plane, assuming that the XY plane extending in the vertical direction is a reference. A normal line NL of the planar reflective surface MS3 is within the plane parallel to the YZ plane, and is in an inclined state at an angle of approximately from 20 degrees to 40 degrees counterclockwise with respect to the Z-axis.

As described above, the semi-transmissive mirror 23 is disposed so that the angle formed by the Y-axis that is the vertical axis and the semi-transmissive mirror 23 is less than 45 degrees. Supposing that the angle formed by the Y-axis and the semi-transmissive mirror 23 becomes greater than 45 degrees, the semi-transmissive mirror 23 is brought into a state of being laid down than the standard and a thickness of the semi-transmissive mirror in a Z-axis direction eventually increases, while when the angle formed by the Y-axis and the semi-transmissive mirror 23 becomes less than 45 degrees, the semi-transmissive mirror 23 is brought into a state of being turned up than the standard and the thickness of the semi-transmissive mirror in the Z-axis direction decreases. That is, the angle formed by the Y-axis and the semi-transmissive mirror 23 is made less than 45 degrees as in the first embodiment, which makes it possible to avoid a configuration in which the semi-transmissive mirror 23 largely protrudes in the −Z direction from the back face with respect to the concave mirror 24, and to avoid an increase in thickness in a Z direction of the front and back of the virtual image display apparatus 100 or the optical unit 12.

The concave mirror 24 is a curved optical member that functions as a semi-transmissive surface mirror illustrated in FIG. 1, and includes a concave reflective surface MC having a concave shape toward the exit pupil EP. The concave mirror 24 forms a metal film or a dielectric multilayer film at one surface 24r of a parallel plate 24a having uniform thickness and having transmissivity to make the concave reflective surface MC. The planar reflective surface MS3 has reflectance and transmittance that are set to approximately from 20 to 50%, for example. Note that an antireflective film may be formed on the other face 24f of the parallel plate 24a. The concave reflective surface MC is not limited to a spherical surface, and may be an aspheric surface. The concave mirror 24 reflects the image light ML reflected by the semi-transmissive mirror 23 and advancing forward, and allows the image light ML to partially transmit the semi-transmissive mirror 23 and to be collected at the exit pupil EP while causing the image light ML to return to the semi-transmissive mirror 23.

At this time, the emission optical axis AXE from the semi-transmissive mirror 23 toward the concave mirror 24 is turned back by the concave mirror 24 to coincide with an optical axis toward the exit pupil EP. The exit pupil EP is at a position conjugated with the entrance pupil PI disposed before the folding mirror 22.

The concave mirror 24 is incorporated to form a part of the appearance member 103. That is, a plate-like member having transmissivity or not having transmissivity is provided around the concave mirror 24 in an extending manner to make the appearance member 103 including the concave mirror 24. The appearance member 103 is not limited to a member having an eyeglass lens-like shape, and may be shaped into various contours or appearances.

In the above, the second mirror 22b is not parallel to the semi-transmissive mirror 23. That is, the angle α2 that is an inclination angle of the second mirror 22b is different from the angle α3 that is an inclination angle of the semi-transmissive mirror 23. As a result, a lateral axis H corresponding to a lateral direction of an image is rotated so as to form an inclination angle θ with respect to the horizontal Z direction when considering the projection optical axis AX0 of the projection optical system 21, that is, when viewed along the projection optical axis AX0. The lateral axis H of the image corresponds to a lateral side of the display area 11a of the image light generation device 11 when the image light generation device 11 has a rectangular shape as illustrated in the figure. The lateral axis H of the image corresponds to an HD extending parallel to the X direction when considering the emission optical axis AXE passing through the exit pupil EP, that is, when viewed along the emission optical axis AXE.

An arrangement relationship between the folding mirror 22, and the semi-transmissive mirror 23 and the concave mirror 24 will be described. The folding mirror 22 is disposed between the semi-transmissive mirror 23 and the concave mirror 24. Specifically, the first mirror 22a and the second mirror 22b are arranged inside a space having wedge-shaped cross section interposed between an extension plane P21 virtually extending the planar reflective surface MS3 of the semi-transmissive mirror 23 and a vertical cylindrical curved surface P11 virtually extending an upper end outer side of the concave mirror 24 in the vertical Y direction. Moreover, in order to satisfy more preferred conditions, the first mirror 22a and the second mirror 22b are arranged between a vertical plane P22 virtually extending an upper end of the planar reflective surface MS3 of the semi-transmissive mirror 23 in the vertical Y direction and a second approximate curved surface P12 virtually extending the upper end outer side of the concave mirror 24. In the above, the space interposed between the extension plane P21 virtually extending the semi-transmissive mirror 23 and the vertical cylindrical curved surface P11 virtually extending the upper end outer side of the concave mirror 24 in the vertical Y direction is referred to as the space having wedge-shaped cross section, however, the space in which the folding mirror 22 is disposed depends on the dispositions and the shapes of the semi-transmissive mirror 23 and the concave mirror 24 without being limited to the space having wedge-shaped cross section. The above is also applicable to other embodiments or modified examples described below.

It is desired that an arrangement relationship between the projection optical system 21 and the image light generation device 11, and the semi-transmissive mirror 23 and the concave mirror 24 be also the same as the folding mirror 22, however, the arrangement relationship is subject to a size restriction such as a length of the projection optical system 21. It is desired that the projection optical system 21 and the image light generation device 11 be arranged inside the space having wedge-shaped cross section interposed between the virtual extension plane P21 of the semi-transmissive mirror 23 and the vertical cylindrical curved surface P11 set for the concave mirror 24, however, when this configuration is not easily achieved, it is desired that the projection optical axis AX0 extending from the display surface 11a of the image light generation device 11 to the folding mirror 22 be disposed between the extension plane P21 and the vertical cylindrical curved surface P11. More preferably, it is desired that the projection optical system 21 and the image light generation device 11 be arranged between the vertical plane P22 set for the semi-transmissive mirror 23 and the approximate curved surface P12 set for the concave mirror 24, however, when this configuration is not easily achieved, it is desired that the projection optical axis AX0 extending from the display surface 11a to the folding mirror 22 be disposed between the vertical plane P22 and the approximate curved surface P12.

The first mirror 22a and the second mirror 22b that constitute the folding mirror 22 are arranged to avoid blocking an effective area EA1 of the concave mirror 24 and an effective area EA2 of the semi-transmissive mirror 23. For example, the effective area EA1 is indicated by a dotted line near the semi-transmissive mirror 23. Specifically, the second mirror 22b is located, in side view, closer to the image display device 11 or the projection optical system 21 than an area formed by the effective area EA1, the effective area EA2, and light rays of a view angle of upper and lower outermost ends of the image light ML reflected by the semi-transmissive mirror 23. In terms of optical design, it is easy to lower the second mirror 22b constituting the folding mirror 22 to a −Y side, however, excessively lowering the second mirror 22b and the like prevents eyesight from the exit pupil EP. As such, the folding mirror 22 is disposed to avoid blocking the effective areas EA1 and EA2 of the concave mirror 24 and the semi-transmissive mirror 23, then an interference between the folding mirror 22, and the concave mirror 24 or the semi-transmissive mirror 23 can be prevented from occurring when the folding mirror 22 is excessively lowered. That is, when viewed from the eye EY or the exit pupil EP of the wearer US, the folding mirror 22 is disposed so as not to interrupt a view angle corresponding to a video image area.

To give descriptions of the optical path, the image light ML from the image light generation device 11 is converged so as to form an image by the projection optical system 21, and is sequentially reflected by the first mirror 22a and the second mirror 22b of the folding mirror 22 to be incident on the semi-transmissive mirror 23. The image light ML reflected by the semi-transmissive mirror 23 by, for example, approximately 50% is incident on the concave mirror 24 to be reflected by the concave reflective surface MC at a reflectance of, for example, not greater than approximately 50%. The image light ML reflected by the concave mirror 24 is incident on the exit pupil EP at which the eye EY or the pupil of the wearer US is disposed. An intermediate image II is formed between the semi-transmissive mirror 23 and the second mirror 22b. The intermediate image II is formed by appropriately enlarging an image formed on the display surface 11a of the image light generation device 11. External light OL passing through the concave mirror 24 is also incident on the exit pupil EP. That is, the wearer US wearing the HMD 200 can observe a virtual image superimposed with an external image by the image light ML.

In the virtual image display apparatus 100 in the first embodiment described above, the folding mirror 22 is disposed between the semi-transmissive mirror 23 and the concave mirror 24, thereby preventing the folding mirror 22 from overhanging frontward from the concave mirror 24 and from overhanging in a back face direction from the semi-transmissive mirror 23, making an overall size of the optical system compact, miniaturizing the virtual image display apparatus 100, and achieving a smart appearance.

Second Embodiment

Hereinafter, a virtual image display apparatus in a second embodiment and an optical unit incorporated into the virtual image display apparatus will be described. Note that the virtual image display apparatus and the like in the second embodiment are a partial modification of the virtual image display apparatus and the like in the first embodiment, and description on common portions is omitted.

Figure 4:
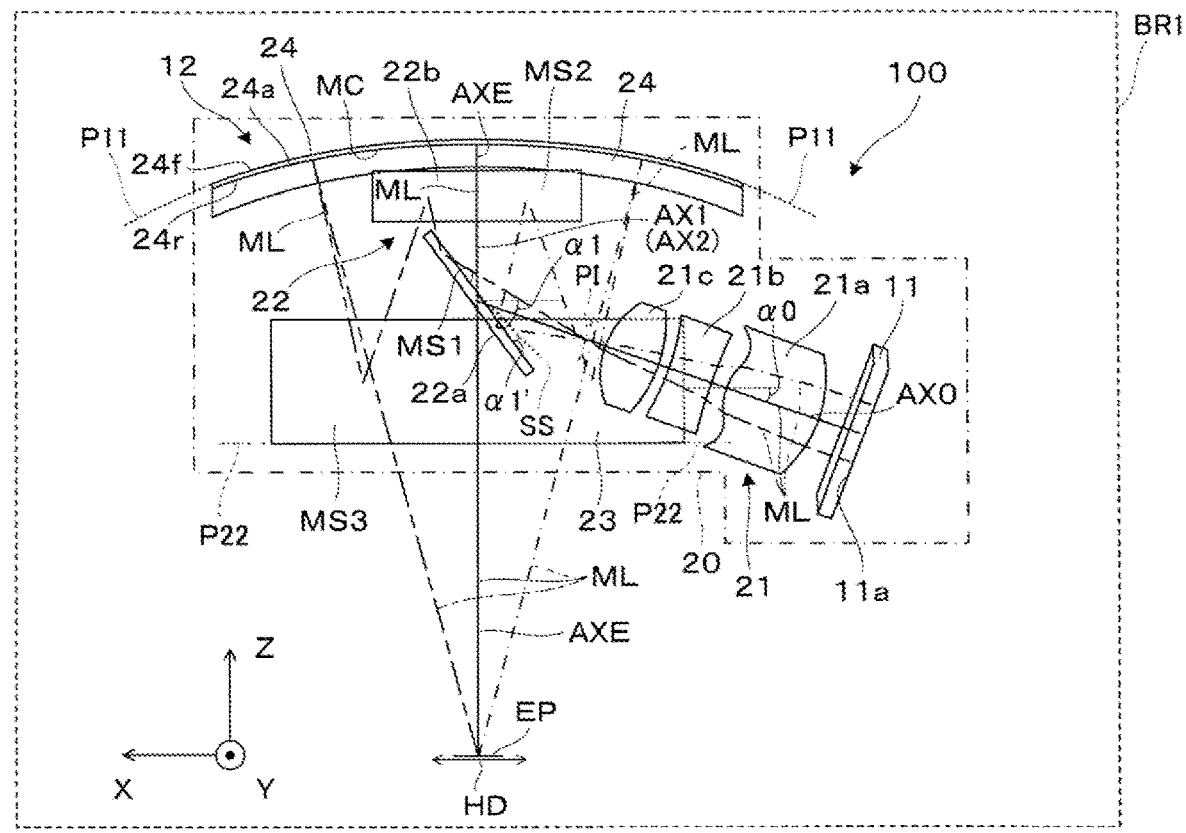
FIG. 4 is a plan view and a side view of a virtual image display apparatus of a second embodiment.
Figure 4:
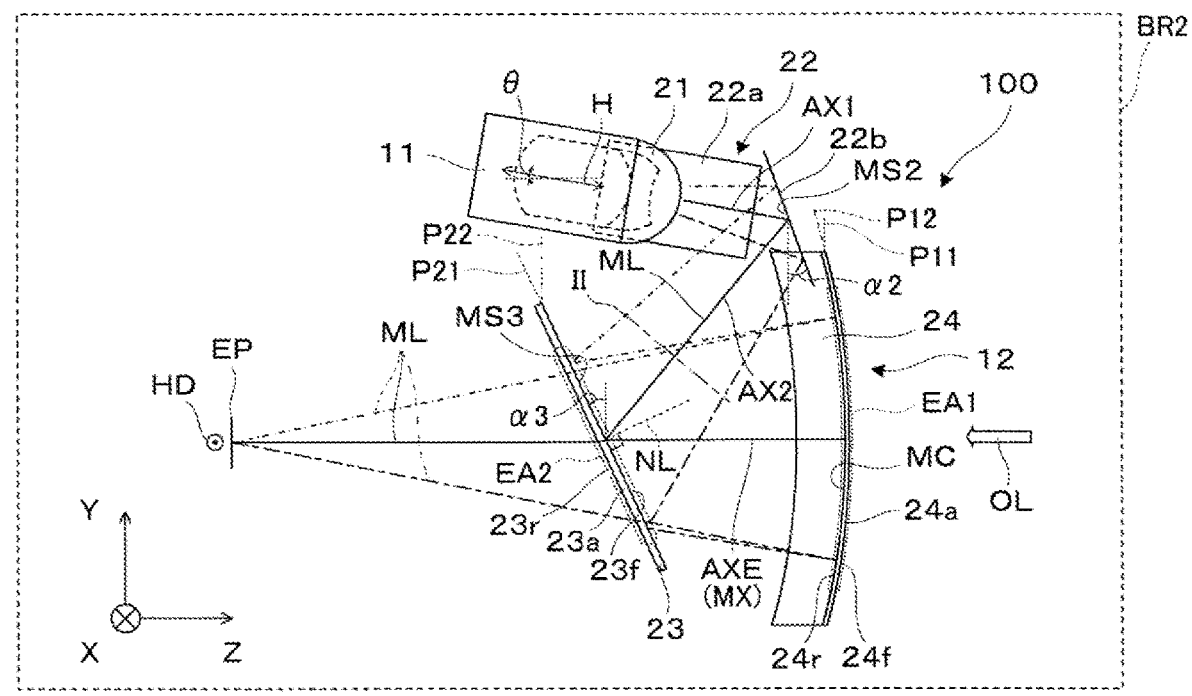

FIG. 4 is explanatory views illustrating the optical structure of the virtual image display apparatus 100 in the second embodiment. In FIG. 4, a first area BR1 is a plan view of the image light generation device 11 and the optical unit 12, and a second area BR2 is a side view of the image light generation device 11 and the optical unit 12.

In this case, the projection optical axis AX0 that is the optical axis of the projection optical system 21 is in an inclined state at an angle $\alpha 0$ in the clockwise direction about the Y-axis perpendicular to the X-axis direction that appears lateral when viewed from above. Corresponding to the above, the first mirror 22a or the planar reflective surface MS1 is in an inclined state at an angle $\alpha 1'=\alpha 0/2$ in the clockwise direction about the Y-axis with respect to a plane SS basically disposed when viewed from above, assuming that a direction inclined at 45 degrees about the Y-axis with respect to the XY plane extending in the vertical direction is a reference.

In the virtual image display apparatus 100 and the optical unit 12 in the second embodiment, the image light generation device 11 and the projection optical system 21 are arranged so that the projection optical axis AX0 is inclined, to a side of the semi-transmissive mirror 23 (that is, a –Z side) upstream on the optical path, with respect to the normal line (a line parallel to the X-axis) of a reference plane (the YZ plane) including the normal line NL of the semi-transmissive mirror 23 and the emission optical axis AXE that coincides with the axis line MX of the concave mirror 24.

In the above, the folding mirror 22 is disposed between the semi-transmissive mirror 23 and the concave mirror 24. Specifically, the first mirror 22a and the second mirror 22b are arranged inside the space having wedge-shaped cross section interposed between the extension plane P21 virtually extending the planar reflective surface MS3 of the semi-transmissive mirror 23 and the vertical cylindrical curved surface P11 virtually extending the upper end outer side of the concave mirror 24 in the vertical Y direction. Moreover, in order to satisfy more preferred conditions, the first mirror 22a and the second mirror 22b are arranged between the vertical plane P22 virtually extending the upper end of the planar reflective surface MS3 of the semi-transmissive mirror 23 in the vertical Y direction, and the second approximate curved surface P12 virtually extending the upper end outer side of the concave mirror 24.

Third Embodiment

Hereinafter, a virtual image display apparatus in a third embodiment and an optical unit incorporated into the virtual image display apparatus will be described. Note that the virtual image display apparatus and the like and the like in the third embodiment are a partial modification of the virtual image display apparatus and the like in the first embodiment, and description on common portions is omitted.

Figure 5:
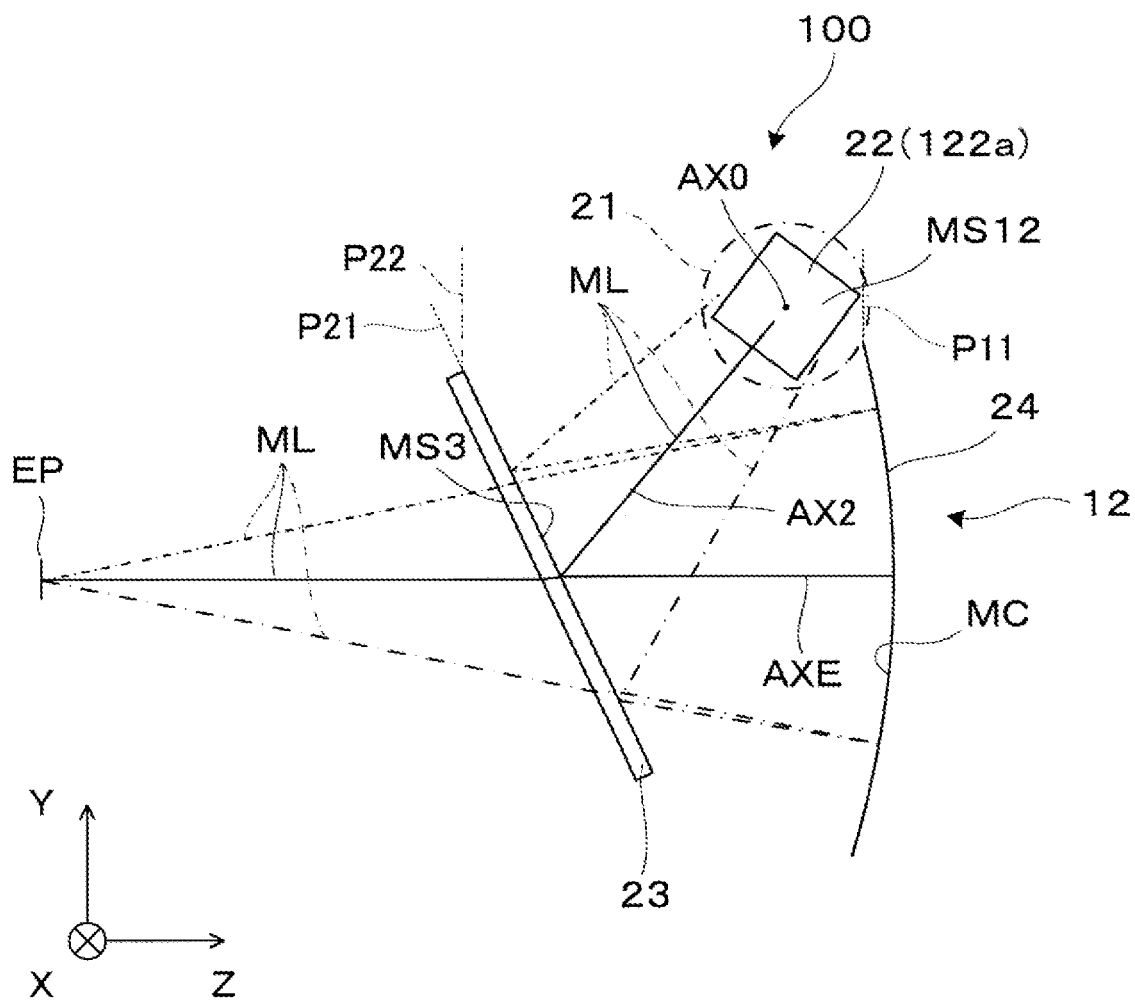
FIG. 5 is a plan view of a virtual image display apparatus of a third embodiment.

FIG. 5 is an explanatory view illustrating the optical structure of the virtual image display apparatus 100 in the third embodiment. In this case, the folding mirror 22 consists exclusively of a single mirror 122a. The normal line of a planar reflective surface MS12 of the mirror 122a extends in the –X direction, the –Y direction, and the –Z direction. The folding mirror 22 reflects the image light ML from the projection optical system 21 in an intersection direction. Specifically, the projection optical axis AX0 of the projection optical system 21 extends in the X direction, and the reflection optical axis AX2 from the folding mirror 22 toward the semi-transmissive mirror 23 is set in an oblique direction between the –Y direction and the –Z direction along the YZ plane.

In the above, the folding mirror 22 is disposed between the semi-transmissive mirror 23 and the concave mirror 24. Specifically, the mirror 122a is disposed inside the space having wedge-shaped cross section interposed between the extension plane P21 virtually extending the planar reflective surface MS3 of the semi-transmissive mirror 23 and the vertical cylindrical curved surface P11 virtually extending the upper end outer side of the concave mirror 24 in the vertical Y direction. Moreover, the mirror 122a is disposed closer to the concave mirror 24 than the vertical plane P22 virtually extending the upper end of the planar reflective surface MS3 of the semi-transmissive mirror 23 in the vertical Y direction.

Fourth Embodiment

Hereinafter, a virtual image display apparatus in a fourth embodiment and an optical unit incorporated into the virtual image display apparatus will be described. Note that the virtual image display apparatus and the like in the fourth embodiment are a partial modification of the virtual image display apparatus and the like in the first embodiment, and description on common portions is omitted.

Figure 6:
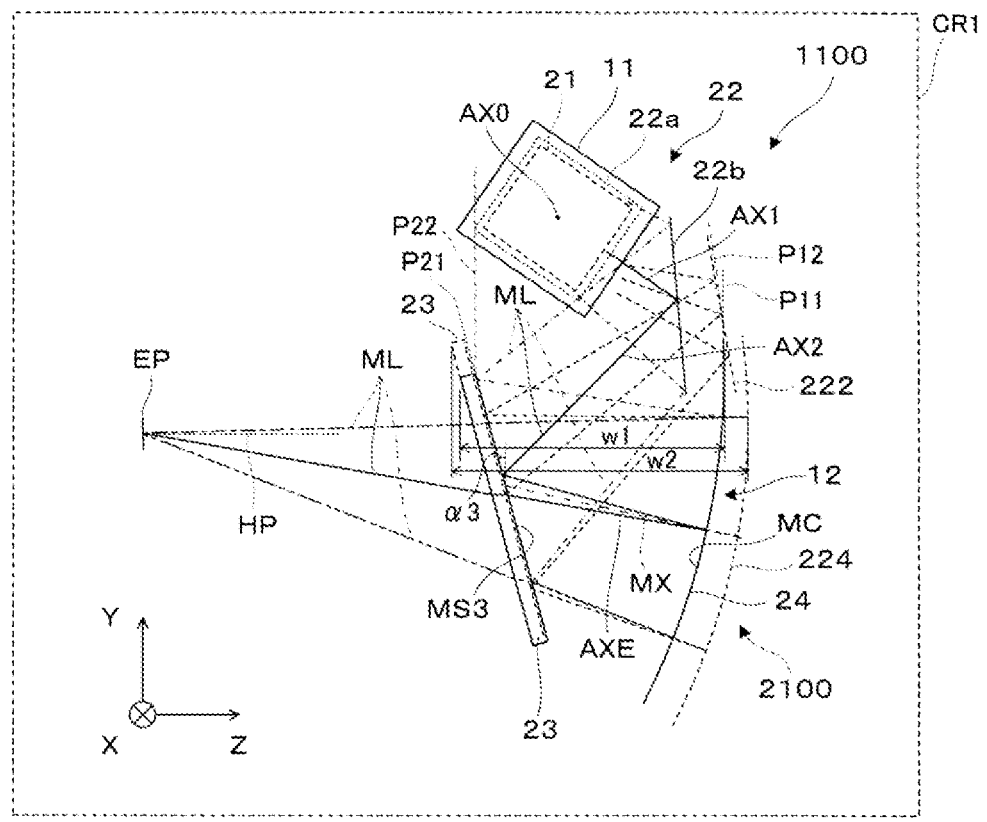
FIG. 6 is side views of a virtual image display apparatus of a fourth embodiment.
Figure 6:
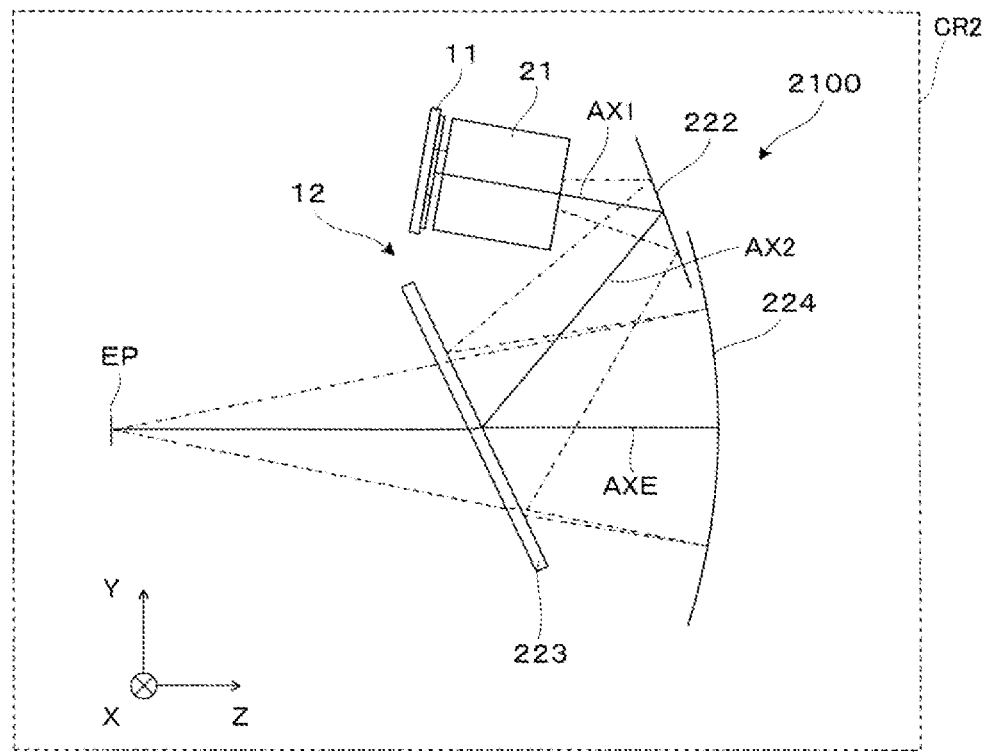

FIG. 6 is explanatory views illustrating an optical structure of a virtual image display apparatus 1100 in the fourth embodiment. In FIG. 6, a first area CR1 is a side view of the image light generation device 11 and the optical unit 12, and a second area CR2 is an explanatory view illustrating an optical structure of a standard virtual image display apparatus 2100.

As illustrated in the first area CR1 in FIG. 6, as in the virtual image display apparatus 100 in the first embodiment, the virtual image display apparatus 1100 includes the image light generation device 11 and the optical unit 12, and the optical unit 12 includes the projection optical system 21, the folding mirror 22, the semi-transmissive mirror 23, and the concave mirror 24. However, in the virtual image display apparatus 1100, the emission optical axis AXE in which the image light is incident on and reflected by the concave mirror 24 is set to an orientation of a predetermined angle, toward the concave mirror 24, downward of a horizontal plane HP orthogonal to a vertical line at a position of the exit pupil EP. Specifically, the emission optical axis AXE from a center of the exit pupil EP toward the concave mirror 24 is set to an orientation of approximately 10 degrees downward of a horizontal +Z-axis. Here, the emission optical axis AXE, at the intersection point between the emission optical axis AXE and the concave mirror 24, is slightly inclined rather than parallel to the axis line MX that is the normal line of the concave mirror 24. That is, the virtual image display apparatus 1100 is a slight off-axis optical system or an eccentric optical system. In case of the virtual image display apparatus 1100 in the fourth embodiment, the semi-transmissive mirror 23 is further turned up by an angle of 10 degrees to make the inclination angle α3 of the semi-transmissive mirror 23 smaller. Moreover, because the optical design for the virtual image display apparatus 1100 is made on the premise that the emission optical axis AXE extends diagonally frontward and downward as described above, the folding mirror 22 and the like are also arranged to be easily fit between the concave mirror 24 and the semi-transmissive mirror 23, and a thickness w1 in a front and back direction of the optical unit 12 is made thin. The standard virtual image display apparatus 2100 indicated by a dotted line within the first area CR1 is the same as the virtual image display apparatus 2100 indicated by a solid line in the second area CR2. In case of the standard virtual image display apparatus 2100, a thickness w2 in the front and back direction of the optical unit 12 is relatively thick.

Note that as for the standard virtual image display apparatus 2100, the optical unit 12 is in common with the virtual image display apparatus 1100 in that the optical unit 12 includes the projection optical system 21, a folding mirror 222, a semi-transmissive mirror 223, and a concave mirror 224. However, in case of the virtual image display apparatus 2100, in consideration of simplicity of display, a display is performed as an optical system in which the reflection optical axis AX1 is caused to coincide with the optical axis of the projection optical system 21 without bending the reflection optical axis AX1.

In the virtual image display apparatus 1100 described above, the folding mirror 22 is disposed between the semi-transmissive mirror 23 and the concave mirror 24. Specifically, the first mirror 22a and the second mirror 22b are arranged inside the space having wedge-shaped cross section interposed between the extension plane P21 virtually extending the planar reflective surface MS3 of the semi-transmissive mirror 23 and the vertical cylindrical curved surface P11 virtually extending the upper end outer side of the concave mirror 24 in the vertical Y direction. Moreover, in order to satisfy more preferred conditions, the first mirror 22a and the second mirror 22b are arranged between the vertical plane P22 virtually extending the upper end of the planar reflective surface MS3 of the semi-transmissive mirror 23 in the vertical Y direction, and the second approximate curved surface P12 virtually extending the upper end outer side of the concave mirror 24.

Fifth Embodiment

Hereinafter, a virtual image display apparatus in a fifth embodiment and an optical unit incorporated into the virtual image display apparatus will be described. Note that the virtual image display apparatus and the like in the fifth embodiment are a partial modification of the virtual image display apparatus in the first embodiment, and description on common portions is omitted.

Figure 7:
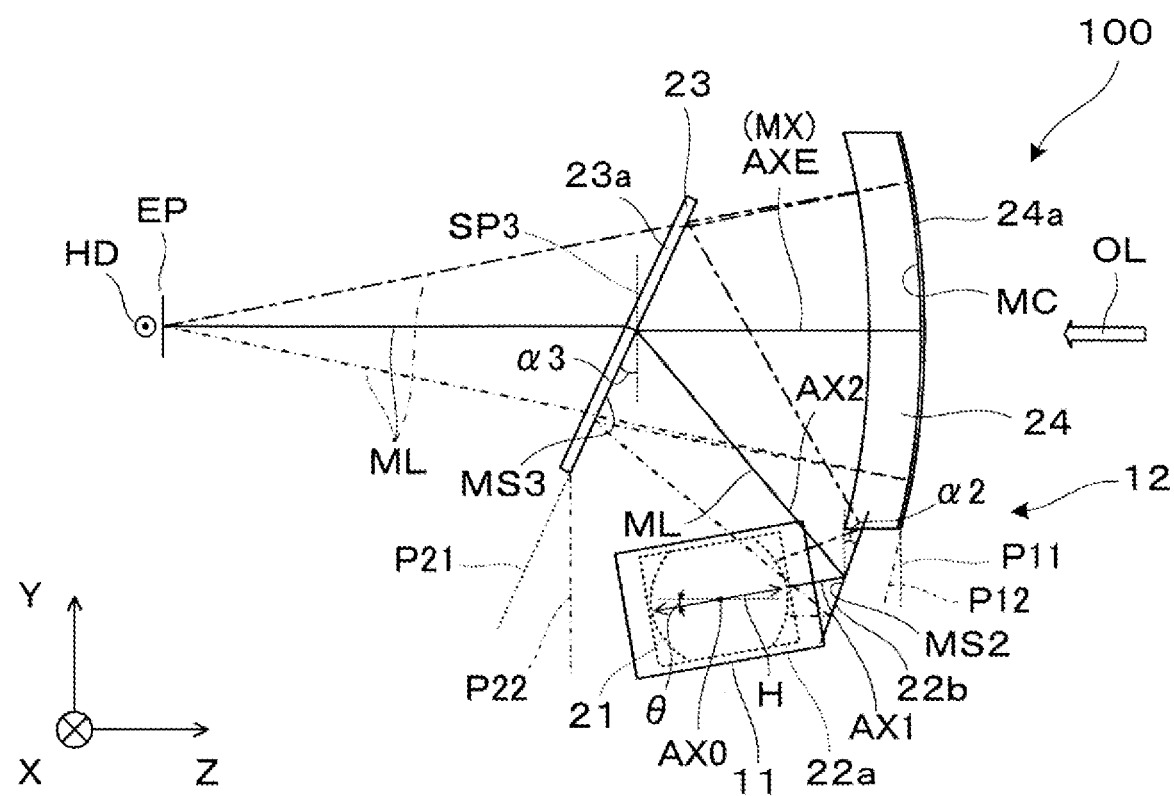
FIG. 7 is a side view of a virtual image display apparatus of a fifth embodiment.

FIG. 7 is an explanatory view illustrating the optical structure of the virtual image display apparatus 100 in the fifth embodiment. In this case, the virtual image display apparatus 100 in the fifth embodiment is inverted upside down with respect to the virtual image display apparatus 100 in the first embodiment. As a result, the image light generation device 11, the projection optical system 21, and the folding mirror 22 are arranged at or below lower ends of the semi-transmissive mirror 23 and the concave mirror 24.

In the above, the folding mirror 22 is disposed between the semi-transmissive mirror 23 and the concave mirror 24. Specifically, the first mirror 22a and the second mirror 22b are arranged inside the space having wedge-shaped cross section, spreading downward, interposed between the extension plane P21 virtually extending downward the planar reflective surface MS3 of the semi-transmissive mirror 23 and the vertical cylindrical curved surface P11 virtually extending the upper end outer side of the concave mirror 24 in the vertical −Y direction. Moreover, in order to satisfy more preferred conditions, the first mirror 22a and the second mirror 22b are arranged between the vertical plane P22 virtually extending the upper end of the planar reflective surface MS3 of the semi-transmissive mirror 23 in the vertical −Y direction, and the second approximate curved surface P12 virtually extending the upper end outer side of the concave mirror 24.

Modified Examples and Others

The present disclosure has been described in line with the embodiments, however, the present disclosure is not limited to the above-described embodiments. The present disclosure may be performed in various modes without departing from the gist of the present disclosure, and, for example, the following modifications may be made.

In the virtual image display apparatus 100 in the above-described embodiments, a self-luminous type display device such as an organic EL element is used for the image light generation device 11. Instead, a configuration in which a laser scanner configured by combining a laser light source with a scanner such as a polygon mirror may also be used for the image light generation device 11. That is, the present disclosure may also be applicable to a laser retinal projection head-mounted display.

In FIGS. 2, 3, and the like, the second mirror 22b is disposed separately from the concave mirror 24, however, the second mirror 22b may be coupled to the concave mirror 24 continuously from the concave mirror 24 to the upside by devising, for example, an adjustment of disposition and angle of the second mirror 22b. In this case, the appearance member 103 may be an integrated member including the concave mirror 24 and the second mirror 22b.

A light control device that controls light by restricting transmitted light from the concave mirror 24 may be attached to the external side of the concave mirror 24. The light control device adjusts transmittance, for example, by electroactuation. Mirror liquid crystals, electronic shades, electrochromic elements, and the like may be used as the light control device. The light control device may adjust transmittance according to external light illuminance. When the light control device blocks the external light OL, only a virtual image that is not affected by an external image can be observed. Further, the virtual image display apparatus of the claimed disclosure is applicable to a so-called closed-type head-mounted display device (HMD) that blocks external light and allows only image light to be visually recognized. In this case, the HMD may also be compatible with a so-called see-through video product constituted by a virtual image display apparatus and an image-capturing device.

In the description above, the virtual image display apparatus 100 is assumed to be mounted and used on the head, and the virtual image display apparatus 100 described above may also be used as a hand-held display that is not mounted on the head and is viewed thereinto like a binocular viewer. That is, the head-mounted display also includes the hand-held display in the present disclosure.

A virtual image display apparatus according to a specific aspect of the present disclosure includes an image light generation device, a projection optical system configured to project image light emitted from the image light generation device, a folding mirror configured to reflect the image light from the projection optical system in an intersection direction, a semi-transmissive mirror configured to reflect a part of the image light from the folding mirror, and a concave mirror configured to reflect the image light reflected by the semi-transmissive mirror toward the semi-transmissive mirror forming an exit pupil, in which the folding mirror is disposed between the semi-transmissive mirror and the concave mirror.

In the virtual image display apparatus described above, the folding mirror is disposed between the semi-transmissive mirror and the concave mirror, thereby preventing the folding mirror from overhanging frontward from the concave mirror and from overhanging in the back face direction from the semi-transmissive mirror, making an overall size of the optical system compact, miniaturizing the virtual image display apparatus, and achieving a smart appearance.

In a specific aspect, the semi-transmissive mirror is disposed so that the angle formed by the vertical axis and the semi-transmissive mirror is less than 45 degrees. In this case, it is possible to avoid a configuration in which the semi-transmissive mirror largely protrudes in the back face direction with respect to the concave mirror, and to avoid an increase in thickness in the front and back direction of the optical system.

In another aspect, the folding mirror is disposed to avoid blocking effective areas of the concave mirror and the semi-transmissive mirror. In this case, an interference between the folding mirror, and the concave mirror or the semi-transmissive mirror can be prevented from occurring when the folding mirror is excessively lowered.

In yet another aspect, the image light generation device and the projection optical system are arranged so that the projection optical axis is inclined to a side of the semi-transmissive mirror with respect to the normal line of the reference plane including the normal line of the semi-transmissive mirror and the axis line of the concave mirror. In this case, it becomes easy to dispose the image light generation device and the like along a facial surface, easily making the virtual image display apparatus have a shape fitting the facial surface or disposed to fit the same.

In yet another aspect, the emission optical axis along which the image light is incident on and reflected by the concave mirror is set to be inclined downward by a predetermined angle, toward the concave mirror, with respect to the horizontal plane orthogonal to the vertical line at the position of the exit pupil. This corresponds to the fact that the line of sight of a person is stabilized in a slightly downcast state downward of the horizontal direction.

An optical unit in a specific aspect includes a projection optical system configured to project image light emitted from the image light generation device, a folding mirror configured to reflect the image light from the projection optical system in an intersection direction, a semi-transmissive mirror configured to reflect a part of the image light from the folding mirror, and a concave mirror configured to reflect the image light reflected by the semi-transmissive mirror toward the semi-transmissive mirror forming an exit pupil, in which the folding mirror is disposed between the semi-transmissive mirror and the concave mirror.

In the optical unit described above, the folding mirror is disposed between the semi-transmissive mirror and the concave mirror, thereby preventing the folding mirror from overhanging frontward from the concave mirror and from overhanging in the back face direction from the semi-transmissive mirror, making an overall size of the optical system compact, and miniaturizing the optical unit.

What is claimed is:

1. A virtual image display apparatus, comprising:
an image light generation device;
a projection optical system configured to project image light emitted from the image light generation device;
a folding mirror configured to reflect the image light from the projection optical system in an intersection direction;
a semi-transmissive mirror configured to reflect a part of the image light from the folding mirror; and
a concave mirror configured to receive the image light reflected by the semi-transmissive mirror and then reflect the received image light back toward the semi-transmissive mirror, forming an exit pupil, wherein
the folding mirror is disposed between the semi-transmissive mirror and the concave mirror when viewed in a first direction, provided that the first direction is a direction from an intersection point between a projection optical axis that is an optical axis of the projection optical system and the folding mirror toward an emission optical axis that is an optical axis from the concave mirror toward the exit pupil.

2. The virtual image display apparatus according to claim 1, wherein
the semi-transmissive mirror is disposed so that an angle formed by a vertical axis and the semi-transmissive mirror is less than 45 degrees.

3. The virtual image display apparatus according to claim 1, wherein the folding mirror is disposed to avoid blocking effective areas of the concave mirror and the semi-transmissive mirror.

4. The virtual image display apparatus according to claim 1, wherein
the image light generation device and the projection optical system are arranged so that the projection optical axis is inclined to a side of the semi-transmissive mirror with respect to a normal line of a reference plane including a normal line of the semi-transmissive mirror and an axis line of the concave mirror.

5. The virtual image display apparatus according to claim 1, wherein
the emission optical axis along which the image light is reflected by the concave mirror is set to be inclined downward by a predetermined angle, toward the concave mirror, with respect to a horizontal plane orthogonal to a vertical line at a position of the exit pupil.

6. The virtual image display apparatus according to claim 1, wherein
the folding mirror is disposed between a first virtual extension surface obtained by virtually extending the semi-transmissive mirror to a side of the projection optical system in the first direction, and a second virtual extension surface obtained by virtually extending the concave mirror to the side of the projection optical system in the first direction.

7. An optical unit, comprising:
a projection optical system configured to project image light emitted from an image light generation device;
a folding mirror configured to reflect the image light from the projection optical system in an intersection direction;
a semi-transmissive mirror configured to reflect a part of the image light from the folding mirror; and
a concave mirror configured to receive the image light reflected by the semi-transmissive mirror and then reflect the received image light back toward the semi-transmissive mirror, forming an exit pupil, wherein
the folding mirror is disposed between the semi-transmissive mirror and the concave mirror when viewed in a first direction, provided that the first direction is a direction from an intersection point between a projection optical axis that is an optical axis of the projection optical system and the folding mirror toward an emission optical axis that is an optical axis from the concave mirror toward the exit pupil.

8. The optical unit according to claim 7, wherein
the folding mirror is disposed between a first virtual extension surface obtained by virtually extending the semi-transmissive mirror to a side of the projection optical system in the first direction, and a second virtual extension surface obtained by virtually extending the concave mirror to the side of the projection optical system in the first direction.

* * * * *